US006438970B1

United States Patent
Ferris et al.

(10) Patent No.: US 6,438,970 B1
(45) Date of Patent: Aug. 27, 2002

(54) APPARATUS METHODS AND COMPOSITIONS FOR PLACING ADDITIVE FLUIDS INTO A REFRIGERANT CIRCUIT

(76) Inventors: James E. Ferris, 15 High Mesa Pl., Richardson, TX (US) 75080; William J. Quest, 5606 Ursula La., Dallas, TX (US) 75229

( * ) Notice: Subject to any disclaimer, the term of this patent is extended or adjusted under 35 U.S.C. 154(b) by 0 days.

(21) Appl. No.: 09/965,749

(22) Filed: Sep. 28, 2001

Related U.S. Application Data

(63) Continuation-in-part of application No. 09/802,178, filed on Mar. 8, 2001.

(51) Int. Cl.$^7$ .............................................. F25B 45/00
(52) U.S. Cl. ................................. 62/77; 62/85; 62/114
(58) Field of Search ................................. 62/77, 85, 114

(56) References Cited

U.S. PATENT DOCUMENTS

| | | | | |
|---|---|---|---|---|
| 3,785,163 A | * | 1/1974 | Wagner ........................... | 62/77 |
| 3,976,110 A | * | 8/1976 | White ............................ | 141/346 |
| 4,110,998 A | * | 9/1978 | Owen ............................. | 62/125 |
| 4,535,802 A | * | 8/1985 | Robertson ....................... | 137/322 |
| 5,181,390 A | * | 1/1993 | Cavanaugh et al. ............. | 62/126 |
| 5,247,804 A | * | 9/1993 | Paige et al. .................... | 62/77 |
| 5,540,254 A | * | 7/1996 | McGowan et al. .............. | 137/315 |
| 5,711,158 A | * | 1/1998 | Yoshida et al. .................. | 62/77 |
| 5,842,349 A | * | 12/1998 | Wakita et al. ................... | 62/85 |
| 5,999,700 A | * | 12/1999 | Geers ............................ | 392/441 |
| 6,183,663 B1 | * | 2/2001 | Kalley et al. ................... | 252/68 |

* cited by examiner

Primary Examiner—William C. Doerrler
Assistant Examiner—Mark Szulman
(74) Attorney, Agent, or Firm—Henry Croskell, Esq.

(57) ABSTRACT

A supply canister is partially filled with a refrigerant circuit additive fluid which is partially evacuated, said refrigerant circuit additive fluid is comprised of a combination of a binding azeotrope of methanol and cyclohexanone with a drying agent, a metal sealant and a rubber rejuvinating compound in a single container.

Additive fluids from the canister may be placed into the refrigerant circuit of an air conditioning system by (1) connecting the canister to the circuit after it has been emptied and vacuum pressure created therein, (2) connecting the canister to the refrigerant circuit suction line during system operation, or (3) connecting the canister to the suction line with the system off, to thereby force refrigerant from the circuit into the canister, and then starting the system to cause the vacuum pressure in the suction line to draw the contents of the canister into the refrigerant circuit.

15 Claims, 2 Drawing Sheets

APPARATUS METHODS AND COMPOSITIONS FOR PLACING ADDITIVE FLUIDS INTO A REFRIGERANT CIRCUIT

This application is a continuation-in-part application of Ser. No. 09/802,178 filed on Mar. 8, 2001, still pending.

FIELD OF THE INVENTION

The present invention relates to methods of dehydrating, passivating, sealing of refrigeration systems and a method for delivering combination of a binding azeotrope of methanol and cyclohexanone, a drying agent, a moisture activated metal treatment and rubber rejuvinating compound into a single container.

The present invention generally relates to the maintenance of air conditioning or refrigeration systems and, in a preferred embodiment thereof, more particularly relates to apparatus and methods for placing an additive fluid in to the refrigerant circuit of an air conditioning system.

In the typical air conditioning or refrigeration system it is often necessary to place an additive fluid (normally a liquid) into the refrigerant circuit portion of the system to maintain the performance of the system at a satisfactory level. Examples of additive fluids placed in refrigerant circuits include compressor oil, stop-leak liquid, acid neutralizers, drying agents, and ultraviolet colored leak-finder liquid.

Additive fluids of these and other types are conventionally placed in refrigerant circuits by one of four methods— namely, (1) the refrigerant circuits by one of four methods (2) the additive fluid is placed in a container along with pressurized refrigerant and is expelled with the pressurized refrigerant into the circuit; (3) the additive fluid is placed in an in-line storage device, and pressurized refrigerant is flowed through the storage device to force the additive fluid into the circuit along with the pressurized refrigerant; or (4) the additive fluid is injected into the circuit using a mechanical piston to force the fluid into the circuit.

These conventional techniques carry with them certain known problems, limitations and disadvantages. For example, to simply open the refrigerant circuit and pour the additive in can undesirably cause release of refrigerant to the atmosphere, and can also undesirably introduce contaminating air into the circuit. Packaging an additive fluid in a container with pressurized refrigerant to be forcibly injected into the circuit is also undesirable due the expense of adding refrigerant to the container as a propellant, the safety concerns inherent in a pressurized container structure, and the need to match the refrigerant propellant with the type of refrigerant within the circuit. Placing the additive fluid in an in-line device requires that the refrigerant forced through the device match the refrigerant in the circuit to avoid contamination of the circuit. Injecting additive fluid into a refrigerant circuit using a mechanical piston device tends to be a somewhat cumbersome task requiring specialized packaging and/or equipment.

Recently, severe restrictions by the U.S. Government has been placed on use of chlorofluorocarbons (CFCs) due to environmental problems which are as a result of the destruction of stratospheric ozone. In addition, CFCs have been labeled as environmentally unsafe in many countries worldwide. As a result, proposed alternative substances which can be substituted for CFCs in various applications have been and are being developed. Among them are several new proposed hydrofluorocarbons (HFCs). A substitution which is being used is HFC-R134a and related compounds. These materials are being sold as a substitutes for CFC as a refrigerant liquid for CFC as refrigeration fluids. These replacement materials, while not ozone-depleting continue to contribute in part to the greenhouse effect. Their use and escape into the atmosphere is the subject of the EPA's Significant New Alternatives Programs, which limits the use of fluroinated compounds as alternatives for ozone-depleting chemicals.

The HFC replacement fluids are generally not as efficient as CFCs and require new types of additives including fluids, sealants, metal and rubber sealants as well as dehydrates and others. In addition, redesign of compressive-evaporative refrigeration and other systems using the HFCs has been necessary. The newer working fluid refrigerants exhibit different soluabilities than CFCs, and are not mixable with well known lubricants in CFC systems as well as other additives. For example, in a modern system using these compounds in cooperation with known lubricants causes hydrolysis of the lubricating esters in a chemical reversion process. Further, other chemical additives in the new environmental partially safe system cause additional metal and rubber leakage which, again, can bring on additional problems for the FPA and the environment.

Leaks allow refrigerants and other working fluids to escape into the atmosphere, contaminating the environment and decreasing the efficiency and cooling capacity of the unit. If large amounts of cooling working fluids such as refrigerants escape, the system may overheat and the service life of the unit will thereby be shortened. Further, the unit may suffer mechanical failure from the loss of the working fluid. In general, leaks in heating and cooling systems also decrease the heat transfer efficiency of these systems.

Water in all types of compressive-evaporative systems decreases the system efficiency as a result of water's high heat of vaporization and high heat capacity. The high heat of fusion of water decreases the efficiency of a compressive-evaporative system by giving off heat in evaporation cycles as the water freezes. The resulting ice crystals can also block orifices in expansion valves and cause such systems to malfunction.

A need continues to exist in the art for a method for sealing leaks in refrigeration, air conditioning, heating and ventilation and related systems and for the complete dehydration of the systems. More importantly, there is a need that exist in the prior art for the addition in a one-step application of a drying agent, a moisture activated metal treatment and a rubber rejuvinating compound in a single container in combination with a binding azeotrope.

As can readily be seen from the foregoing, a need exists for improved apparatus, methods for placing additive fluids and said additive fluids into a refrigerant circuit. It is to this need that the present invention is directed.

SUMMARY OF THE INVENTION

In carrying out principles of the present invention, in accordance with a preferred embodiment thereof, a specially designed vessel or canister is provided for use in placing an additive fluid, representatively an additive liquid, into the refrigerant circuit of an air conditioning or refrigeration system, representatively an automotive air conditioning system. In a preferred embodiment thereof, the vessel has an interior communicatable with a suction line portion of the refrigerant circuit, the vessel interior being partially filled with an additive liquid, being partially evacuated to a vacuum pressure less than that of the suction line portion during operation of the air conditioning system, and being substantially devoid of refrigerant.

According to a first method of utilizing the partially evacuated vessel, the interior of the vessel is initially communicated with the interior of the suction line portion during operation of the air conditioning system, representatively using a refrigerant recharge hose assembly, whereupon the greater vacuum pressure in the suction line portion of the refrigerant circuit draws the additive liquid into the suction line portion.

According to a second method of utilizing the partially evacuated vessel, the refrigerant circuit is emptied and a vacuum pressure is created therein which is greater than the vacuum pressure within the vessel. The vessel is then communicated with the interior of the refrigerant circuit, representatively using a refrigerant recharge hose assembly, whereupon the greater vacuum pressure within the emptied refrigerant circuit draws the additive fluid into the refrigerant circuit.

Accordingly to a third method of utilizing the partially evacuated vessel, the interior of the vessel is initially communicated with the interior of the suction line portion, representatively using a refrigerant recharge hose assembly, while the air conditioning system is turned off and a positive pressure exists in the interior of the suction line portion. The positive pressure within the suction line portion forces refrigerant therefrom into the vessel, thereby positively pressurizing its interior. Next, the air conditioning system is turned on to create a negative pressure within the suction line portion, thereby drawing the refrigerant and additive liquid from the positively pressurized canister interior into the suction line portion.

The provision and use of the specially designed partially evacuated vessel provides a variety of advantages over conventional pressurized canisters containing refrigerant and liquid additive. For example, since there is no refrigerant in the vessel, the same additive liquid-containing vessel can be used with a wide variety of air conditioning or refrigeration systems that utilize different type of refrigerants—the vessel does not have to be "matched" to a particular type of refrigerant in a circuit in order to avoid contamination thereof by a different type of refrigerant within the vessel.

Moreover, since refrigerant is not packaged within the vessel, the material cost of the partially filled vessel is substantially reduced. Additionally, since there is no refrigerant disposed within the as-manufactured vessel it cannot leak refrigerant into the atmosphere, and the lack of pressurized refrigerant within the as-manufactured vessel renders it safer to ship and store.

The present invention also includes a method for dehydrating refrigeration systems as well as a method for sealing metal and rubber parts in a refrigerant system. This is accomplished by the invention by using a azeotrope like material with at least 2 to 3 or more additives which are needed by modem air conditioning systems. The invention also includes a method of dehydrating and passivating the refrigerant systems having a fluid enclosure. The method comprises adding a single additive mix maintained in a binding azeotrope like material which allows the treatment of a refrigerant system for many purposes including metal and rubber sealing, dehydration and the like. In a one step application, for example, in R134a systems. The composition containing multiple additives and an azeotrope type mixture is allowed to react with interior surfaces of the enclosure of the refrigerant system to passivate, coat the surfaces as well as dehydrate the whole refrigerant system thus completing a one application treatment for the refrigerant system. An azeotrope or azeotrope mixture of refrigerant additives for sealing both rubber and metal surfaces within a refrigeration system which also dehydrates the system simultaneously because of the dehydrator which is present and is also included in the common container. The compositions include various elements which combine and operate within the binding azeotrope to deliver from a one container or one mix the desired amount of each sealing, dehydrating and treatment of refrigerant systems.

DETAILED DESCRIPTION OF THE INVENTION

Figure 1:
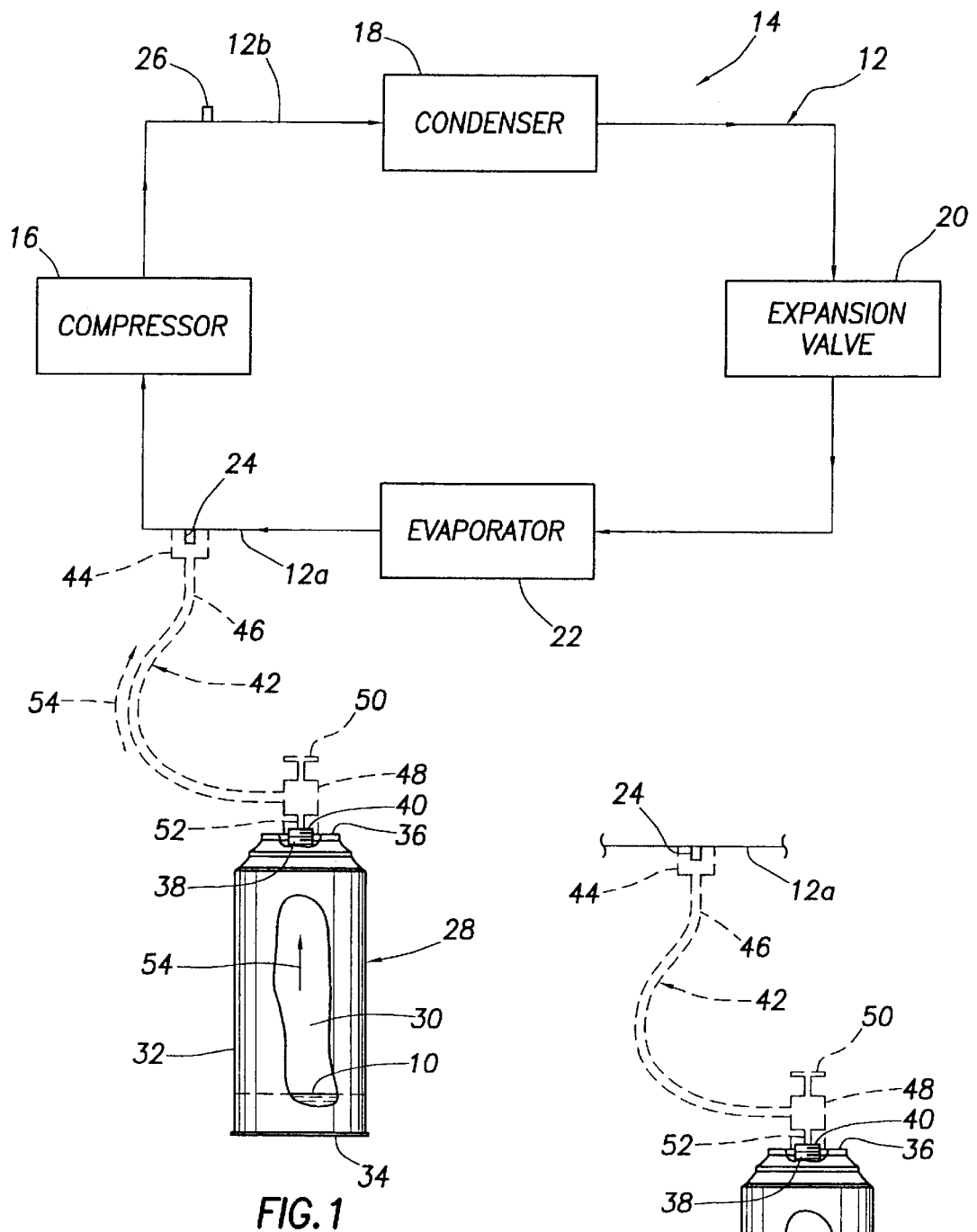
FIG. 1 is a schematic diagram of a representative air conditioning system into the refrigerant circuit portion of which an additive fluid is being placed using a specially designed, partially evacuated additive fluid canister embodying principles of the present invention.
Figure 2:
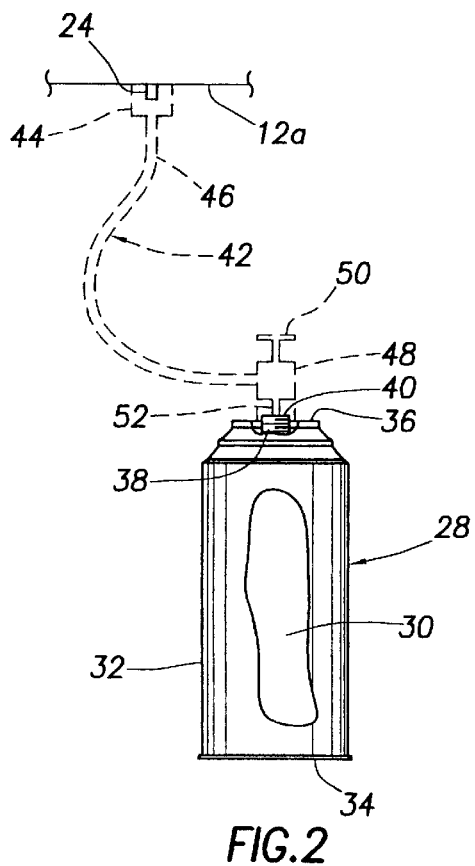
FIG. 2 schematically illustrates the canister after its additive fluid has been placed into the refrigerant circuit, with FIGS. 1 and 2 together illustrating first and second methods of placing an additive fluid into the refrigerant circuit.

Schematically depicted in FIGS. 1 and 2 are first and second methods of placing an additive fluid 10 in the refrigerant circuit 12 of an air conditioning or refrigeration system which is representatively an automotive air conditioning system 14. The additive fluid 10 is representatively an additive liquid such as, for example, compressor oil, a stop-leak liquid, an ultraviolet colored leak-finder liquid, an acid neutralizer, or a drying agent. The air conditioning system 14 is representatively of the direct expansion type and comprises the usual compressor 16, condenser 18, expansion valve 20 and evaporator 22 connected as shown in the refrigerant circuit 12. Compressor 16 is disposed between suction and liquid line portions 12a, 12b of the circuit 12, with suction line portion 12a having a low side pressure tap or service fitting 24 installed therein, and liquid line portion 12b having a high side pressure tap or service fitting 26 installed therein. During operation of the system 14, refrigerant is flowed through the circuit 12 in the direction indicated by the circuit flow arrows in FIG. 1.

According to a key feature of the present invention, a specially designed vessel or canister 28 (see FIG. 1) is partially filled with the additive liquid 10 and is partially evacuated to a vacuum pressure suitable for the air conditioning system with which the canister 28 is to be used (representatively in the range of from about 12" to about 15" Hg vacuum for an automotive air conditioning system refrigerant circuit) which is (1) less than the vacuum pressure within the refrigerant circuit suction line portion 12a (typically in the range of from about 20" to about 30" Hg vacuum for an automotive air conditioning system refrigerant circuit) during operation of the air conditioning system refrigerant circuit) during operation of the air conditioning system 14 with refrigerant operatively flowing through the circuit 12, and (2) less than the positive pressure within the suction line portion 12a (for example, about 78.4 psig when the ambient temperature is 75 degrees F.) when the air conditioning system 14 is not operating, and refrigerant is not being flowed through the circuit 12.

As schematically depicted in FIG. 1, the partially evacuated interior 30 of the canister 28, as originally fabricated, contains only the additive liquid 10 and is devoid of refrigerant. The canister 28 thus differs in two primary regards from conventional additive injection canisters—namely, (1) it does not contain refrigerant, and (2) its interior is at a substantial negative pressure as opposed to being highly pressurized. Canister 28 is of a suitable metal material and has a hollow cylindrical body 32 with a lower end 34 and an upper end 36 having an externally threaded tubular projection 38 thereon, the projection 38 having a closed upper end 40.

Representatively, the refrigerant circuit 12 schematically depicted in FIG. 1 is filled with R134a refrigerant, with the suction line service fitting 24 being of a different configuration than that of the liquid line service fitting 26. However, the principles of the present invention are not limited in any manner to an R134a refrigerant circuit. To place the additive liquid 10 into the refrigerant circuit 12 using a first method of the present invention, the interior 30 of the canister 28 (see FIG. 1) is communicated with the interior of the refrigerant circuit 12, using a conventional R134a refrigerant recharge hose assembly 42 which is illustrated in phantom for purposes of illustrative clarity.

Recharge hose assembly 42 includes a quick disconnect fitting 44 (or another type of connection fitting such as a threaded fitting) interconnected by a length of refrigerant charging hose 46 to an internally threaded tapping/dispensing valve 48 having a rotatable handle 50 useable to axially drive a piercing stem portion 52 of the valve 48. To ready the canister 28 for use in placing the additive liquid 10 into the refrigerant circuit 12, the tapping/dispensing valve 48 (with its piercing stem 52 in an upwardly retracted position) is threaded onto the tubular projection 38 of the canister 28, and the quick disconnect fitting 44 is connected to the suction line service port 24.

With the air conditioning system 14 running, and refrigerant being operatively flowed through the suction line portion 12a at a vacuum pressure greater than that in the partially evacuated canister interior 30, the tapping/dispensing valve handle 50 is operated to pierce the upper end 40 of the canister projection 38 and place canister interior 30 in communication with the interior of the suction line portion 12a. As indicated by the arrows 54 in FIG. 1, the higher vacuum pressure in the suction line portion 12a draws the additive liquid 10 from the partially evacuated canister interior 30 into the suction line portion 12a, thereby emptying the canister 30 of its additive liquid content as shown in FIG. 2.

This higher vacuum pressure emptying of the canister 28 may be facilitated by inverting the 28 and holding it higher than the suction line service fitting 24. After the additive liquid 10 is placed into the refrigerant circuit in this manner, the refrigerant recharge hose assembly 42 is disconnected from the service fitting 24 and the canister 28 and the now emptied canister 28 discarded.

With continued reference to FIGS. 1 and 2, a second method of utilizing the specially designated, partially evacuated canister 28 to place its additive liquid 10 into the refrigerant circuit 12 is to communicate the interior 30 of the canister 28 with the interior of the refrigerant circuit (e.g., at its suction line portion 12a), using the hose assembly 42, while the refrigerant circuit 12 has been emptied for repair and has a service vacuum pressure within the interior 30 of the canister 28. The service vacuum pressure within the refrigerant circuit 12 pulls the additive liquid 10 from the canister interior 30 into the refrigerant circuit 12 as indicated by the arrows 54 in FIG. 1.

Figure 3:
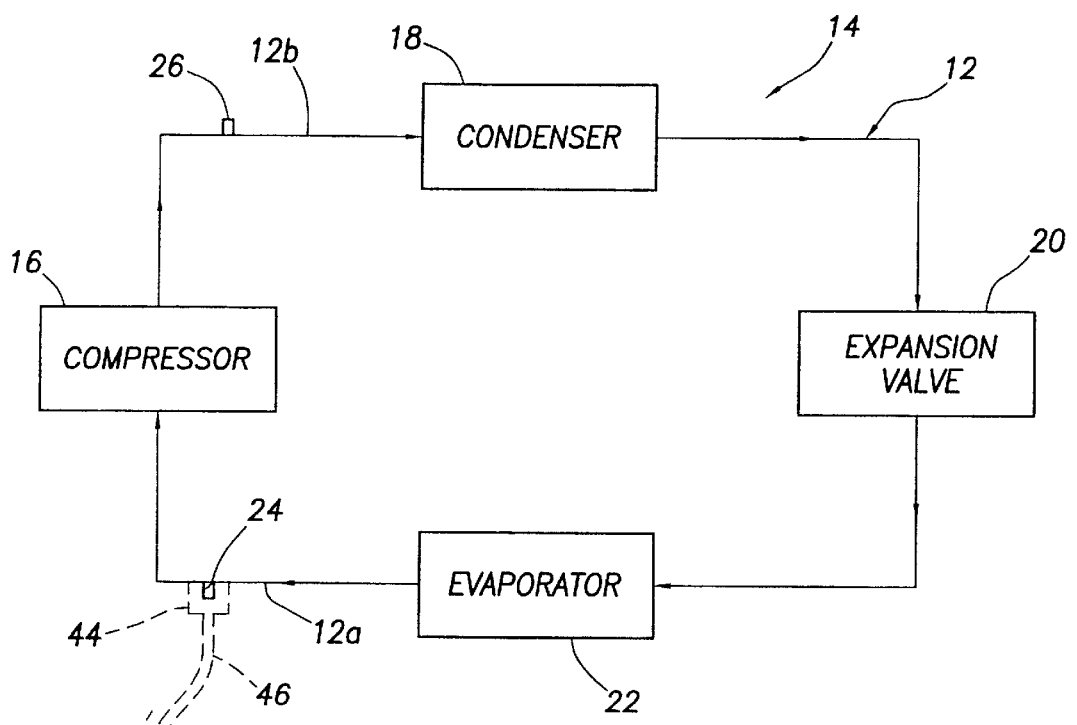
FIGS. 3 and 4 are schematic diagrams similar to those in FIGS. 1 and 2 and together illustrate a third method of placing an additive fluid and into a refrigerant circuit using the partially evacuated additive fluid canister.
Figure 3:
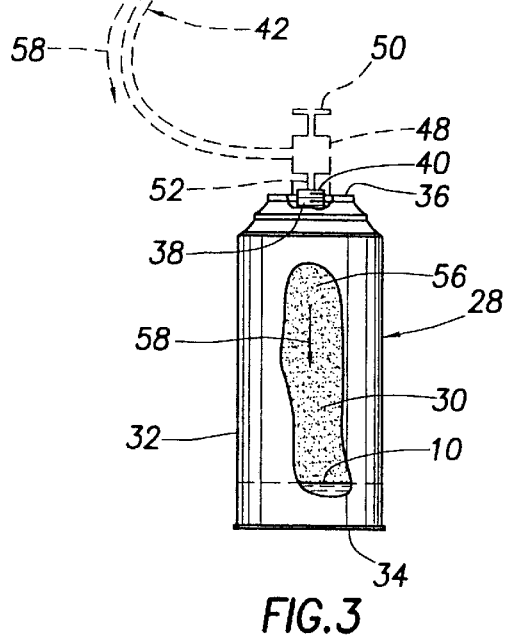
Figure 4:
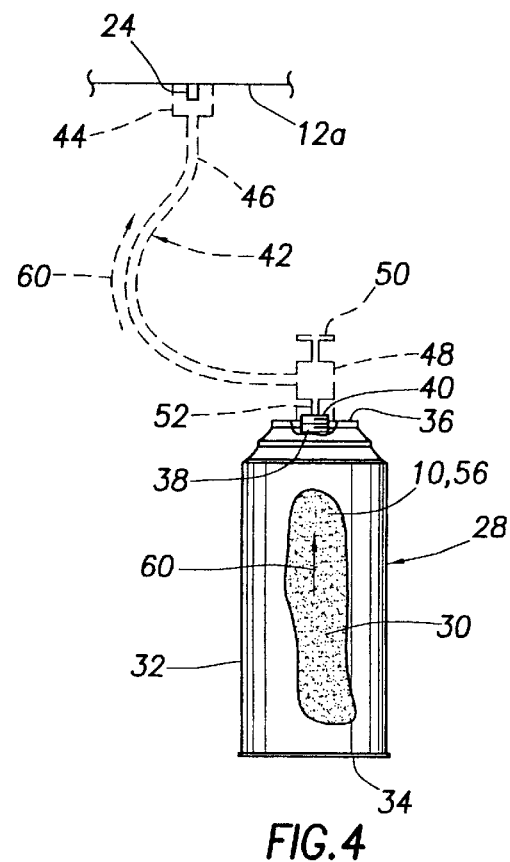

A third method of utilizing the specially designed, partially evacuated canister 28 to place its additive liquid 10 into the refrigerant circuit 12 is schematically illustrated in FIGS. 3 and 4 to which reference is now made. Utilizing this second method, with the air conditioning system 14 initially being turned off, so that refrigerant is not being flowed through the circuit 12 and a positive pressure is present in the interior of the suction line portion 12a, the partially evacuated canister 28 is interconnected via the hose assembly 42 to the suction line service fitting 24, with the tapping/dispensing valve 48 being in its closed position, as previously described. The valve handle 50 is then rotated to axially drive the stem 52, pierce the canister projection 38, and initially communicate the partially evacuated canister interior 30 with the positively pressurized refrigerant within the suction line portion 12a.

As depicted in FIG. 3, this causes positively pressurized refrigerant 56 from within the interior off the suction line portion 12a to be forcibly flowed into the partially evacuated canister interior 30 via the hose 46, as indicated by the arrows 58 in FIG. 3, to become in effect a carrier for the additive liquid 10. Next, the air conditioning system 14 is turned on to create an operative flow of refrigerant 56 through the circuit 12 and generate in the suction line portion 12a a vacuum pressure. The positive pressure previously created in the interior 30 of the canister 28 by the forcible injection of refrigerant 56 thereinto causes the liquid additive and refrigerant 10,56 within the canister interior 30 to be flowed into the suction line portion 12a, via the hose 46, as indicated by the arrows 60 in FIG. 4, thereby substantially emptying the canister 28 of its refrigerant and additive contents. This transfer of refrigerant and additive to the circuit 12 may be facilitated by inverting the canister 28 and positioning it at a higher level than that of the suction line service fitting 24. After such transfer is completed, the refrigerant recharge hose assembly 42 is disconnected from the canister 28 and the service fitting 24, and the emptied canister 28 discarded.

The provision and use of the specially designed partially evacuated canister 28 provides a variety of advantages over conventional pressurized canisters containing refrigerant and liquid additive. For example, since there is no refrigerant in the canister, the same canister can be used with a wide variety of air conditioning or refrigeration systems that utilize different types of refrigerants—the canister does not have to be "matched" to a particular type of refrigerant in a circuit in order to avoid contamination thereof by a different type of refrigerant within the canister.

Moreover, since refrigerant is not packaged within the canister, the material cost of the partially filled canister is substantially reduced. Additionally, since there is no refrigerant disposed within the as-manufactured canister it cannot leak refrigerant into the atmosphere, and the lack of pressurized refrigerant within the as-manufactured canister renders it safer to ship and store.

The pressurization can be a refrigerant gas which carries along with it the various additives as discussed above. The dehydrating and sealing compositions preferably each include at least one compound and generally include two or more compounds of each requirement for dehydration, metal sealing and rubber sealing. The object of the present invention is to provide an improved air conditioning system treatment composition, in which the improvement provides for the combination of a drying agent, a moisture-activated metal treatment and a rubber rejuvenating compound into a single container, unlike conventional air conditioning systems where multiple containers are used. The improved air conditioning system treatment composition comprises of a binding azeotrope like material, the binding azeotrope is preferred to be methanol and cyclohexanone combined with a drying agent, a moisture activated metal treatment and a rubber rejuvinating material. The combination of a binding azeotrope of methanol and cyclohexanone with a drying agent, and a moisture activated metal treatment and rubber rejuvinating compound into a single container is not known.

For purposes of this invention, a mixture of two or more components is azeotropic if it vaporizes with no change in the composition of the vapor from the liquid. Specifically, azeotropic mixtures include both mixtures that boil without changing composition, and mixtures that evaporate at a temperature below the boiling point without changing composition. Accordingly, an azeotropic mixture may include mixtures of two components or more over a range of proportions for each specific proportion of the components is azeotropic at a certain temperature but not necessarily at other temperatures. Azeotrope and azeotrope like compositions vaporize with no change in their composition. If the applied pressure is above the vapor pressure of the azeotrope, the azeotrope evaporates without change. If the applied pressure is below the vapor pressure of the azeotrope, the azeotrope boils or distills without change. The vapor pressure of low boiling azeotropes is higher and the boiling point is lower than that of the individual components. In fact, the azeotropic composition has the lowest boiling point of any composition of its components. Thus, the azeotrope can be obtained by distillation of a mixture whose composition initially departs from that of the azeotrope. Azeotropes can exist in systems containing two liquids (A and B) as binary azeotropes, three liquids (A, B and C) as ternary azeotropes, and four liquids (A, B, C, and D) as quarternary azeotropes.

For purposes of this invention, other alcohols can be used in combination as an azeotrope. The term alcohols represents a broad class of hydroxyl-containing organic compounds. For example, monohydric alcohols of about one to three carbon atoms can be used or various dihydric, trihydric and polyhydric alcohols for forming azeotropes suitable for the present inventive mix. Furthermore, these alcohols when dehydrated act as a water scavenger. Even though the alcohols are used in the azeotropes or azeotrope like mixtures. These dehydrated alcohols can be a part of the azeotrope or can operate independently as a water scavenger. Those dehydrated alcohols which do form azeotropes or azeotrope like mixtures can also scavenge water.

In one preferred method and composition, the sealing compositions which are preferably added to the dehydrating compositions and the passivating compositions for a one time injection into the refrigerant system function with and are compatible with each other. The sealing compositions circulate within the fluid enclosure within the system as does the passivating and dehydrating compositions. If the system has a leak, the sealing composition exits through the leak and hydrolytically reacts with moisture in the atmosphere to form a polymeric seal on the external surface of the system.

Preferred fluorocarbon-based working fluids useful in conjunction with the compositions of the additive fluids of the present invention include those having a numerical fluorocarbon code designated by the American Society of Refrigerating Engineers (ASRE). Preferred ASRE codes include 11, 12, 12B1, 13, 13B1, 14, 21, 22, 32, 42, 115, 124, 125, 134, R134a, 143a, 152a, 161, 218, and 227.

Preferably, the working fluids chosen are compatible with the compositions used in the methods and fluid mixes and the compositions are chosen to be soluble in the working fluid, the lubricant or both the working fluid and the lubricant. In one embodiment, the composition can be chosen so that one compound within the composition is preferentially soluble in the working fluid and the other compound in the composition is preferentially soluble in the lubricant. It should be understood, based on this disclosure, that other working fluids meeting the above-criteria may be used with the present compositions without departing from the spirit of the invention.

The invention will now be described in more detail with respect to the following specific, non limiting example:

EXAMPLE

The passivation effect, the dehydrating compositions as well as the sealants of the present invention in combination with the azeotropes and carrier material is demonstrated by comparing the surface energies of untreated substrates through the surface energies of substrates traded with the various additives. Various additives all contain silanes and organic silanes for cross-linking metal bonding and rubber sealants. High surface energies are indicated by low contact angles due to polar attractions. The removal of the polar nature of the surface by incorporation of silicon groups repels highly polar water molecules resulting in high contact angles (which can approach 90 degrees) indicating lower surface energy.

A typical vacuum pack contains from about one and a half ounces of refrigerant additives to greater quantities and size of the pack depending on the need. The one and a half ounces of additive is comprised of ¾ ounce of metal sealants having the composition of 60% by volume of vinyltrimethoxysilane, 30% by volume of n-beta (aminoethyl)-gamma-aminopropyltrymethoxysilane; and 10% by volume of methyltrimethoxysilane, a water scavenger. The other additive constituting ¾ of an ounce of a 1½ ounce vacuum pack load is comprised of 50% by volume methanol and 3% by volume of (1) a mix comprising 35% by volume cyclohexanone and 65% by volume methylene chloride; and 47% PAG. These two additive mixtures and azeotropes are carried by R134a carrier which constitutes another 1½ ounce load for the vacuum packed load, bringing the total to 3 ounces. These additives specifically mentioned are joined together in an azeotropic mixture which allows the user to load his vacuum pack or other delivery packaging systems with various amounts, however in this case a total of 3 ounces of additives and R134a carrier, which constitutes the refrigerant in most cases. In review, the methyltryoxysilane is a water scavenger and the vinyl trimethylsilane is a metal bonding material which the n-beta-(aminoethyl)-gamma-aminopropyltrymethoxysilane is for cross linking. While the methanol and cyclohexanone do provide the azeotrope with the cyclohexanone acting as a penetrant and methyl chloride as a softener. The final component is PAG which is polyalkylene glycols (PAGs) and polyol esters which constitute the new lubricants suitable for R134a refrigerants and the like. The water in a system using these lubricants does cause hydrolysis of the lubricating esters in a chemical reversion process. The foregoing detailed description is to be clearly understood as being given by way of illustration and example only, the spirit and scope of the present invention being limited solely by the appended claims.

What is claimed is:

1. An additive fluid for refrigerant circuits are selected from at least two compounds of the group consisting of a binding azeotrope, a drying agent, a moisture-activated metal sealant and a rubber rejuvinating compound; the at least two compounds are contained in one fluid additive.

2. An additive fluid according to claim 1 wherein the azeotrope is comprised of methanol and cyclohexanone.

3. An additive fluid according to claim 1 wherein the metal sealants are comprised of organo-silane compounds.

4. An additive fluid according to claim 1 wherein the azeotrope is comprised of about 98% by volume of methanol and about 2% by volume cyclohexanone.

5. An additive fluid according to claim 1 wherein the drying agent is comprised of a dehydrated alcohol having one to three carbon atoms per molecule.

6. The drying agent according to claim 1 wherein dehydrated dihydric, trihydric and polyhydric alcohols scavenge for water and are capable of forming azeotrope or azeotrope-like mixtures.

7. An additive fluid for refrigerant circuits comprising compositions consisting of an azeotrope, drying agent, a moisture-activated metal sealant, and a rubber rejuvinating compound, selected from the group consisting of;

(1) metal sealants comprising 10% by volume of a water scavenger, 60% by volume of a metal bonding compound and 30% by volume of a cross-linking compound all of which are organo-silane compounds;

(2) an azeotrope comprising about 50% by volume methanol and about 1% by volume cyclohexanone, mixed with about 2% by volume methylene chloride, a softener and about 47% by volume of PAG oil;

(3) a drying agent comprised of a dehydrated alcohol having one to three carbon atoms per molecule;

(4) about an equal amount of all the other components of R134a carrier; and (5) the compositions are contained in the same fluid.

8. A method of placing an additive fluid into a refrigerant circuit, said method comprising the steps of:

providing a vessel having a partially evacuated interior partially filled with an additive fluid, said additive fluid comprising a combination of a binding azeotrope, a drying agent, a moisture-activated metal sealant and a rubber rejuvinating compound; and communicating the refrigerant circuit with said partially evacuated interior of said vessel.

9. The method of claim 8 wherein said providing step is performed using a vessel partially filled with an additive fluid, comprising a combination of a binding azeotrope, a drying agent, a moisture-activated metal sealant and a rubber rejuvinating compound.

10. The method of claim 8 wherein said providing step is performed using a vessel having an interior vacuum pressure in the range of from about 12" Hg to about 15" Hg.

11. The method of claim 8 wherein said communicating step is performed by operatively interconnecting a refrigerant recharge hose assembly between said vessel and said refrigerant circuit.

12. The method of claim 8 wherein:

said refrigerant circuit includes a suction line portion which, during operative flow of refrigerant therethrough, has a vacuum pressure greater than the vacuum pressure within said vessel, and said communicating step includes the step of communicating said partially evacuated interior of said vessel with the interior of said suction line portion, during operative flow of refrigerant therethrough, in a manner flowing said compound comprising an azeotrope, a drying agent, a moisture-activated metal sealant and a rubber rejuvinating compound into said suction line portion from a common container.

13. A method of placing an additive fluid comprising a combination of a binding azeotrope, a drying agent, a moisture-activated metal sealant and a rubber rejuvinating compound, into a refrigerant circuit, said method comprising the steps of:

providing a vessel having a partially evacuated interior partially filled with the additive fluid and being substantially devoid of refrigerant, and communicating the interior of said refrigerant with said partially evacuated interior of said vessel.

14. The method according to claim 13 wherein:

said refrigerant circuit has a suction line portion which, during operative flow of refrigerant flow therethrough, has a vacuum pressure greater than the vacuum pressure within said vessel, and said communicating step is performed by communicating the interior of said suction line portion with said partially evacuated interior of said vessel during operative flow of refrigerant through said suction line portion.

15. The method according to claim 13 wherein:

said refrigerant circuit has a suction line portion which, during operative flow of refrigerant therethrough, has a vacuum pressure greater than the vacuum pressure within said vessel, said suction line portion, in the absence of an operative flow of refrigerant flow therethrough, has a positive pressure, said communicating step is performed by communicating said partially evacuated interior of said vessel with the interior of said suction line portion, during an absence of operative refrigerant flow therethrough, to thereby force refrigerant from said refrigerant circuit into said vessel, and said method further comprises the step, performed after said communicating step, of creating an operative flow of refrigerant through said suction line portion to thereby draw refrigerant and additive liquid into said refrigerant circuit from within said vessel.

* * * * *